United States Patent [19]

Rodger

[11] Patent Number: 4,771,808

[45] Date of Patent: Sep. 20, 1988

[54] APPARATUS FOR CONTROLLING THE FLOW OF GAS

[75] Inventor: Keith P. Rodger, Solihull, England

[73] Assignee: Alexander Controls Limited, Sutton Coldfield, England

[21] Appl. No.: 24,621

[22] Filed: Mar. 11, 1987

[30] Foreign Application Priority Data

Sep. 19, 1986 [GB] United Kingdom ............... 8622600

[51] Int. Cl.⁴ ........................................... F16K 31/06
[52] U.S. Cl. ................................ 137/613; 251/129.17; 251/129.08
[58] Field of Search ................. 251/129.02, 129.16, 251/129.05, 129.17, 129.08; 137/613

[56] References Cited

U.S. PATENT DOCUMENTS

| | | | |
|---|---|---|---|
| 3,134,932 | 5/1964 | Ray | 251/129.17 X |
| 4,304,391 | 12/1981 | Yamaguchi | 251/129.05 |
| 4,349,885 | 9/1982 | Thompson | 137/487.5 X |
| 4,569,504 | 2/1986 | Doyle | 335/279 X |
| 4,641,683 | 2/1987 | Murner | 137/487.5 |

FOREIGN PATENT DOCUMENTS

| | | | |
|---|---|---|---|
| 214084 | 12/1983 | Japan | 251/129.16 |
| 2044412 | 10/1980 | United Kingdom | 251/129.17 |
| 2124342 | 2/1984 | United Kingdom . | |
| 2161584 | 1/1986 | United Kingdom . | |

*Primary Examiner*—Arnold Rosenthal
*Attorney, Agent, or Firm*—Learman & McCulloch

[57] ABSTRACT

An electro-magnetically controlled gas valve has an armature supported by a flexible diaphragm, with the armature and diaphragm being in the magnetic flux path of the electro-magnetic coil, and the armature carrying a resilient seal for engagement with a conical seat forming part of the gas flow path through the valve.

11 Claims, 4 Drawing Sheets

APPARATUS FOR CONTROLLING THE FLOW OF GAS

This invention relates to electro-magnetically operated fluid flow (especially gas) control valves of the kind described in our prior applications GB Pat. Nos. 2124342A and 2161584A in which the closure member is resiliently urged in one direction and is electro-magnetically urged in the opposite direction. These are different from conventional solenoid valves which provide on and off positions only, in that fine control of the flow rate through the valve is possible by varying the electro-magnetic force and balancing it against the resilient force acting in the opposite direction.

The object of the present invention is to provide further improvements.

In accordance with a first aspect of the invention an electro-magnetic valve for the control of fluid flow comprises a body with an inlet and an outlet for the fluid, an electro-magnetic coil, and an armature of electro-magnetic material located so as to be included in the electro-magnetic flux path and urged thereby towards or away from one of the inlet and outlet by said flux, said armature being resiliently urged in the opposite direction, said armature carrying a closure plug for one of the inlet and outlet, characterised in that one or other of the plug and inlet or outlet comprise a resilient yielding material disc or annulus free to deflect in the direction of movement of the plug.

Preferably the armature comprises a peripheral ring trapped in position by components of the valve, a central relatively massive ferro-magnetic part carrying the closure element, and a series of spokelike parts extending between the ring and the centre and which are non-radial for example being curved along their length, so that the ring, arms and centre may be generally coplanar in one position but with the centre located in a plane parallel to the plane containing the peripheral ring in another position. The distortion out of the condition in which all of the parts lie in a common plane may provide a restoring force as the required resilience.

Preferably the core of the electro-magnetic coil is provided with a recess to accommodate a projection on the ferro-magnetic body provided at the centre of the armature, with the projection and recess being of generally complementary shape. This is to improve the electro-magnetic performance.

The said ferro-magnetic body may be effectively fixed to the resilient yielding material disc or annulus by any convenient means, or may serve to locate the yielding material without the two being actually fixed together.

According to a second aspect of the invention, an electro-magnetic valve as above referred to is connected to a pressure transducer (preferably) located downstream of the fluid outlet, with appropriate electronic circuitry between the transducer and the electromagnetic coil so that variations in fluid pressure detected by the transducer adjust the current flow to the coil and hence the armature position so as to adjust the range of fluid flow through the electro-magnetic valve. By these means a gas governor can be provided giving effectively substantially constant line pressure downstream of the valve irrespective of pressure fluctuations upstream of the valve.

According to a third aspect of the invention, the gas governor of the preceding paragraphs is modified by the inclusion of a current controller in the circuitry, whereby the fluid flow rate can be adjusted in close conformity with movement of the adjusting device. This aspect of the invention may be particularly convenient for gas appliances to give minimum flow, simmer and higher gas flow rates.

In accordance with a fourth aspect of the invention, the gas governor of the preceding paragraphs is modified by the addition of a thermostat controlled circuit whereby the electromagnetic valve will be controlled in accordance with a desired temperature setting. This aspect of the invention is also particularly suitable for use with gas appliances.

It is an important feature of the invention that the resilient yielding material on the disc or annulus contacts a converging surface provided on the other of the plug and inlet or outlet. Thus for example, where the resilient material is carried by the armature and moved by the electro-magnetic flux, the converging surface may be a frusto-conical portion surrounding the gas flow path and providing the seat upon which the disc or annulus seals in the closed position in which gas flow is prevented. This frusto-conical surface enables relatively high sealing pressures to be applied by relatively low spring forces, enabling the diaphragm itself to be used as the spring. This not only simplifies construction in avoiding the use of a separate spring, but it also has advantages in that the electro-magnetic control can be applied so much more finely when it is not being used primarily to overcome the resistance of a spring.

Instead of providing a frusto-conical surface around the inlet or outlet port which is closed by the yielding disc or annulus carried by the armature, it will be within the scope of the invention to provide a yielding annulus around the port, and use for example a conical non-yielding face on the armature. The same advantages would be attained.

Various embodiments of the invention are now more particularly described with reference to the accompanying drawing in which.

Figure 1:
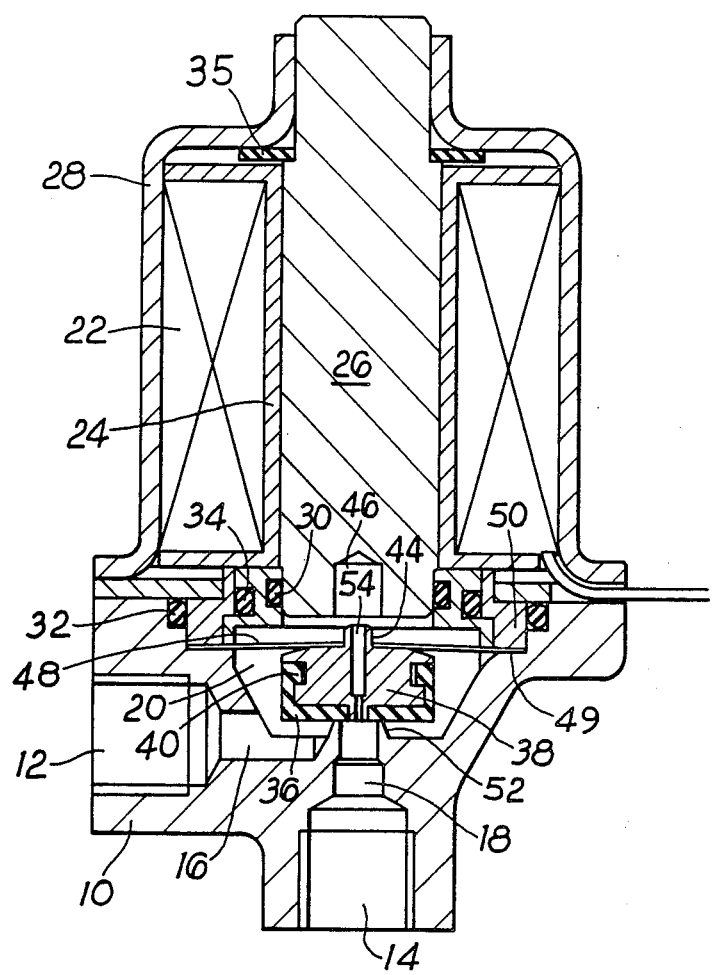
FIG. 1 is a sectional elevation of a first embodiment of valve according to the invention.

Referring now to FIG. 1 of the drawings, the valve comprises a main body member 10 provided with inlet 12 and outlet 14 ports which both communicate via passages 16 18 with a valve chamber 20.

The valve further comprises an electro-magnetic coil 22 wound on a spool 24 about a core 26 and enclosed in a housing 28. Gas leakage out of the chamber 20 is prevented by O rings 30, 32, 34. A spring washer 35 controls the coil position.

The valve closure member comprises a rubber, plastics or like yielding material annulus 36 which, in this embodiment, is made captive with the main armature body which is a plug of ferro-magnetic material 38. To this end, the plug has a peripheral groove receiving an inturned rim 40 formed integrally with the annulus 36. However, the annulus could instead be a disc located by a peripheral rim or flange on the body 38 or possibly could be fixed to the body 38 by a suitable adhesive.

The body 38 is provided with a projection 44 of generally complementary shape and smaller dimensions than recess 46 in the adjacent end of the core 26.

Figure 3:
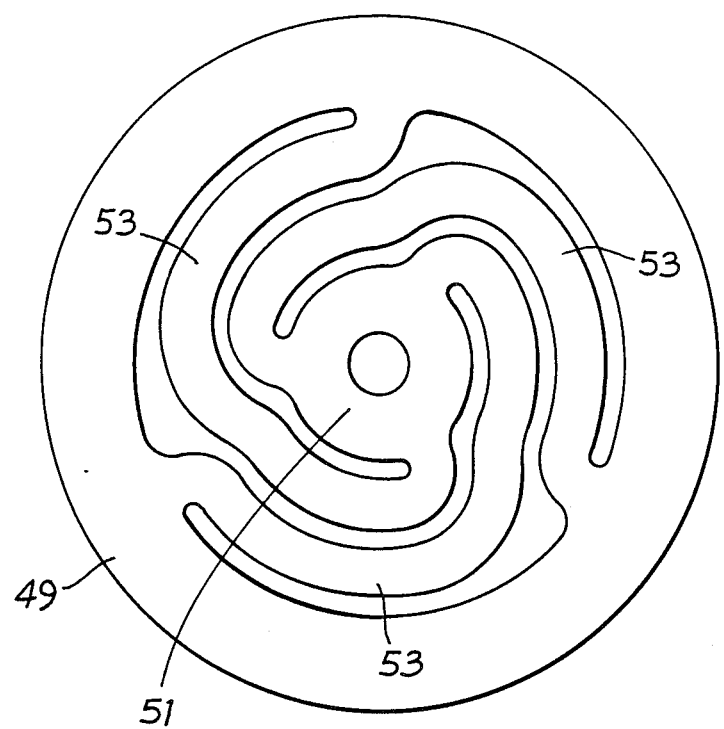
FIG. 3 is an enlarged scale plan view of one component of the valve of FIG. 1 or FIG. 2.

The ferro-magnetic body 38 is held in the central position within the chamber 20 by part 48 also shown in FIG. 3 which acts somewhat as a diaphragm permitting the required axial movement of part 38 towards or away from the core 26. The part 48 is however also made of a ferro-magnetic material which is springy and comprises a peripheral ring-like portion 49 which is clamped between the body part 10 and a fixing ring 50, a central portion 51 which receives and may be for example a force fit onto the projection 44, and a series of non-straight generally spoke-like parts 53 extending between the central part and the ring.

The base of the chamber 20, through which the passages 16 18 extend is provided with a frustoconical surface 52 around the passage 18, and it is the rim of this surface which contacts the annulus 36. This can result in high sealing pressure, per unit area, between the annulus and passage 16, obtained from a relatively low spring force available from the diaphragm-like part 48. In this embodiment, a bleed passage 54 opens through the part 38 for example for providing a constant flame pilot light of a gas burner even when the illustrated valve is in the closed position.

When coil 22 is energised, the electro-magnetic flux loop includes the diaphragm like part and the body 38 and the latter is attracted towards the core so as to lift the annulus from the rim 52. The rate of flow depends upon the pressure of the fluid (gas) and the extent to which the disc is lifted, and hence upon the electro-magnetic force generated. By varying the current, the EMF varies, and the valve opens more, or less.

Figure 2:
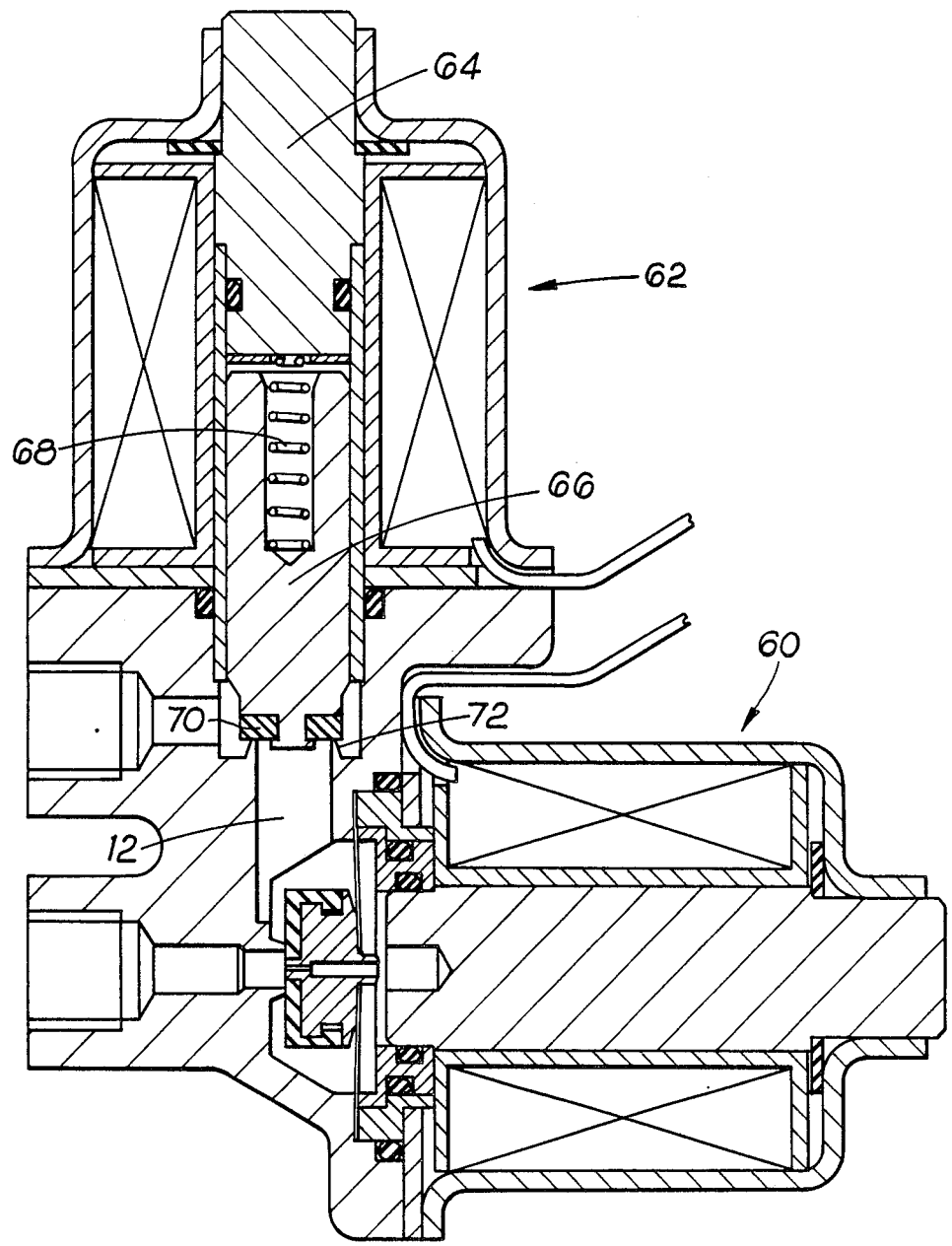
FIG. 2 is a similar view of a second embodiment.

The valve in FIG. 2 includes a flow rate control valve 60 which is generally similar to that illustrated in FIG. 1 and for that reason needs no further description. However, inlet 12 of said valve 60 is in this second embodiment the outlet of a second valve 62. Valve 62 comprises a body, inlet and outlet, valve chamber, electro-magnetic coil, spool, housing, all generally as per valve 60. However core 64 and armature 66 are located axially end to end in the spool, and are urged apart by spring 66. The armature carries an annulus 70 for seating on the frusto-conical seat 72. Valve 62 is a simple on/off valve which may be for example coupled to a flame failure device.

The pressure transducer may be located in or on the body part on the outlet side of the valve, feeding its signal current to appropriate electronics controlling directly, or via further modifying or adjusting circuitry to the current supply for the coil 22, according to whether the valve is to be used as a governor, or otherwise.

Figure 4:
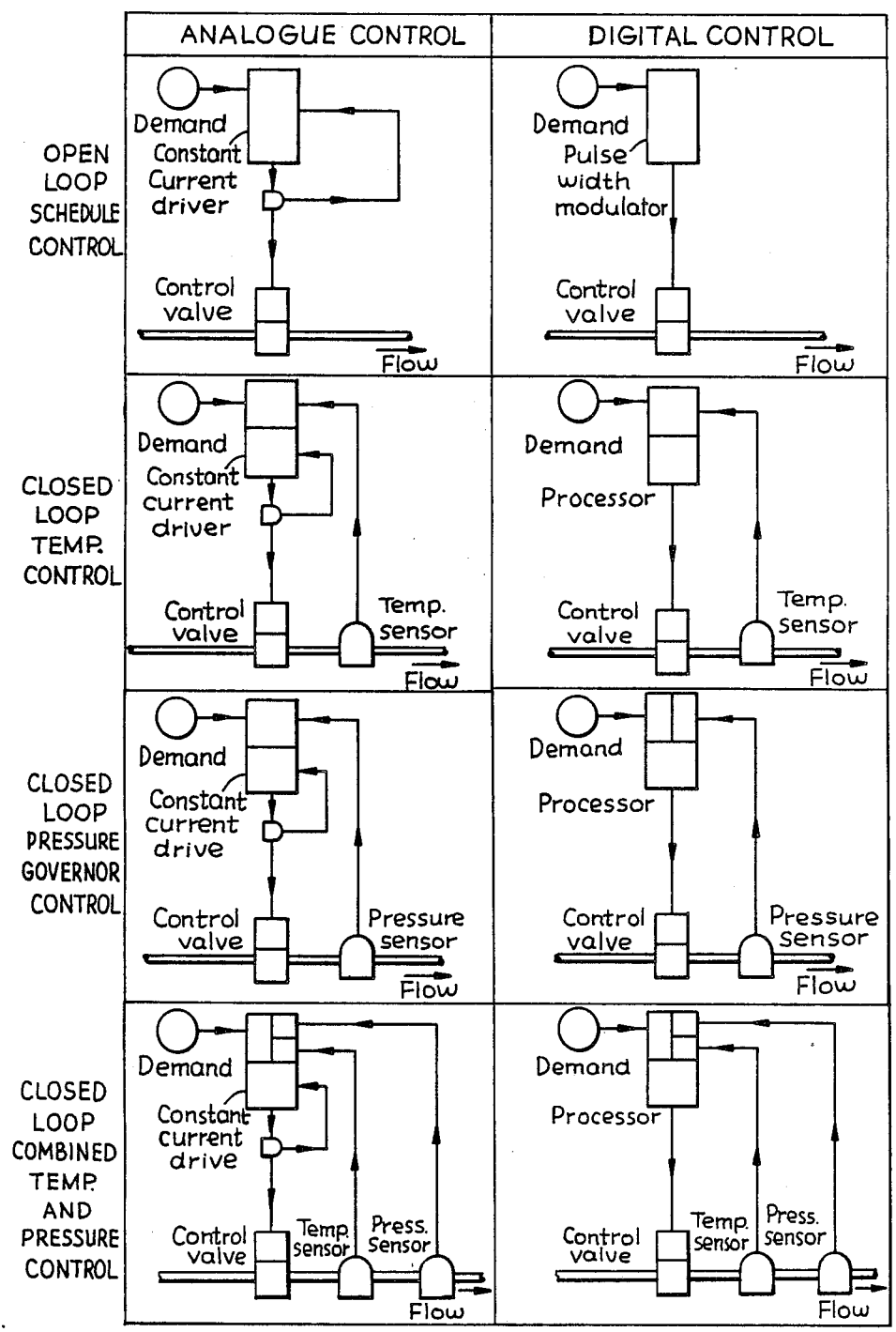
FIG. 4 is a series of schematic diagrams of different control circuits embodying the valve of the invention.

FIG. 4 shows schematically different control arrangements in which the demand consists of a voltage proportional to the required gas flow rate. In open loop schedule control the required voltage is effectively fed direct to the control valve.

In closed loop temperature control, a temperature sensor modifies the demand led voltage to modify the setting of the control valve.

In pressure or governor control, a pressure sensor is located in the supply line downstream of the control valve and the sensed pressure is used to modify the demand setting to the control valve.

Both temperature and pressure sensors may be used together.

I claim:

1. An electromagnetic, variable flow valve comprising a body having a fluid inlet, a fluid outlet, and a port between said inlet and said outlet; an electromagnetic coil having a core; an electromagnetic armature interposed between said port and said core and being spaced from said core by an air gap, said armature being movable between a first position in which it seats on and seals said port and other positions in which it is spaced from said port; a disc-like support formed of electromagnetic, springy material occupying said gap and being interposed between said armature and said core, said support having its center fixed to said armature and its periphery clamped to said body, said support having a plurality of non-radial spokes extending between its periphery and its center; and means for applying an energizing current of selected magnitude to said coil to establish an electromagnetic flux path through said air gap sufficient to effect movement of said armature from said first position in a direction toward said core and through a distance proportional to the magnitude of the current supplied to said coil, the movement of said armature toward said core flexing said spokes, the springiness of the material forming said support acting on said armature and urging the latter to return to said first position when said coil is deenergized.

2. An electro-magnetic valve as claimed in claim 1 connected in circuit with a pressure transducer located downstream of the fluid outlet.

3. An electro-magnetic valve as claimed in claim 2 including a current controller in the circuit.

4. A valve according to claim 1 whrein said armature is fixed to said support by a projection on said armature that extends through said support, said core having a recess therein for the removable accommodation of said projection.

5. A valve according to claim 4 wherein said recess has a cross-sectional area greater than that of said projection.

6. A valve according to claim 4 wherein said armature and said projection have a bleed passage extending therethrough to establish restricted communication between said inlet and said outlet when said armature is in said first position.

7. A valve according to claim 1 wherein said armature abuts said support.

8. A valve according to claim 1 wherein only said support lies between said armature and said core.

9. A valve according to claim 1 comprising a second body having a fluid inlet and a fluid outlet, and an electromagnetic on/off valve for controlling the flow of fluid through said second body, said outlet of said second body being in communication with the inlet of the first-mentioned body.

10. A valve according to claim 1 including a bleed passage extending through said armature for establishing restricted communication between said inlet and said outlet when said armature is in said first position.

11. A valve according to claim 1 wherein said armature carries resilient, yieldable means engageable with said port to seal the latter when said armature is in said first position.

* * * * *